United States Patent [19]

Brun

[11] Patent Number: 5,856,019
[45] Date of Patent: Jan. 5, 1999

[54] PROCESS FOR PRODUCING A POLYOLEFIN COATING, SUBSTRATE PROVIDED WITH THE SAID COATING, AND ITS USE FOR COMING INTO CONTACT WITH MOVING POWDERS

[75] Inventor: Claude Brun, Idron, France

[73] Assignee: Elf Atochem S.A., France

[21] Appl. No.: 580,683

[22] Filed: Dec. 29, 1995

[30] Foreign Application Priority Data

Dec. 29, 1994 [FR] France ................................. 9415852
Dec. 29, 1994 [FR] France ................................. 9415853

[51] Int. Cl.$^6$ ........................... B32B 15/08; B32B 27/00
[52] U.S. Cl. ...................... 428/461; 427/340; 427/388.1; 427/299; 502/103; 502/117
[58] Field of Search ............................. 422/340–2, 299; 427/388.1; 428/461; 502/103, 117

[56] References Cited

U.S. PATENT DOCUMENTS

| | | | |
|---|---|---|---|
| 2,718,473 | 9/1955 | Powers | 117/49 |
| 3,071,858 | 1/1963 | Alter | 30/351 |
| 3,083,118 | 3/1963 | Bridgeford | 427/340 X |
| 3,322,565 | 5/1967 | Smith, Jr. | 117/106 |
| 4,467,080 | 8/1984 | Brun et al. | 526/62 |
| 5,075,136 | 12/1991 | Nield et al. | 427/175 |
| 5,470,811 | 11/1995 | Jejelowo et al. | 502/152 X |
| 5,475,075 | 12/1995 | Brant et al. | 526/160 X |

FOREIGN PATENT DOCUMENTS

| | | |
|---|---|---|
| A-0 376 654 | 7/1990 | European Pat. Off. . |
| A-918147 | 3/1947 | France . |
| A-1092858 | 4/1955 | France . |
| A-1 215 101 | 11/1959 | France . |
| B-12 06 334 | 12/1965 | Germany . |
| A-15 04 109 | 2/1969 | Germany . |
| A-815 482 | 6/1959 | United Kingdom . |

*Primary Examiner*—Michael Lusignan
*Attorney, Agent, or Firm*—Bell, Boyd & Lloyd

[57] ABSTRACT

The process according to the invention consists in bringing the substrate to be coated into contact with a solution of a catalyst of olefin polymerization and in then polymerizing at least one olefin in gaseous phase in the presence of the said substrate. The invention also relates to the use of an item including a coating made of polymer for coming into contact with polyolefin particles, the polymer forming the coating including chain sequences of formula —$CH_2$—CHR—.

57 Claims, No Drawings

PROCESS FOR PRODUCING A POLYOLEFIN COATING, SUBSTRATE PROVIDED WITH THE SAID COATING, AND ITS USE FOR COMING INTO CONTACT WITH MOVING POWDERS

FIELD OF THE INVENTION

The present invention relates to a process for producing a polyolefin coating on a substrate.

BACKGROUND OF THE INVENTION

A coating can be produced by spraying powdered polyolefin onto a substrate heated to a temperature that is higher than the melting temperature of the polyolefin. An alternative form of this process consists in immersing a heated substrate in a fluidized bed of polyolefin powder. This type of process is difficult to use when the substrates to be coated are of large size or when it is desired to coat only part of the substrate. Moreover, when it is the inner wall of a chemical reactor that it is desired to coat, access by the operator or the operator's intervention may not be possible. Furthermore, this type of process produces coatings that are not very adherent, especially because they are very thick and not very uniform in thickness.

DESCRIPTION OF THE INVENTION

A process for producing a polyolefin coating on a substrate, enabling the abovementioned problems of the previous techniques to be solved, has now been found.

The process according to the invention produces coatings which are very adherent to the substrate without it being necessary to employ an adhesive or binder between the coating and the substrate. The coatings are of uniform thickness, even in the case of substrates of large size.

The process according to the invention is particularly suited for covering the inner walls and the inner components of hollow bodies such as vessels, chemical reactors or pipes.

It may be desired to cover the inner walls as well as the stirrer and perhaps the baffles of chemical reactors or the inner wall of pipes when the intention is to protect these walls, for example, against corrosion.

The process according to the invention is particularly advantageous for coating items intended to come into contact with particles, in particular particles containing a polymer or a copolymer, and more particularly when this polymer or copolymer originates from at least one olefin as monomer.

It is found, in fact, that in the absence of a suitable coating, such items can become covered with aggregates of these particles, following phenomena of accumulation of electrostatic charges. The coating obtained by the process according to the invention and applied at least in the place where there is a risk that these aggregates may be formed makes it possible to reduce or even to completely inhibit these phenomena which risk being detrimental to the optimum functioning of the plants of which the said items form a part.

One such item may be a pipe, inside which a powder is conveyed with the aid of a gas. In this case the process according to the invention can be applied to the inner surface of the pipe.

One such item may be a vessel or a reactor intended to contain a fluidized or agitated bed of powders. The reactor may be a reactor for gas-phase or liquid-phase polymerization of, for example, polyolefins. In this case the process according to the invention may be applied to the inner wall of the vessel or of the reactor and to their internal accessories such as, for example, their possible stirrers and/or baffles.

The process according to the invention is characterized by the following stages:

a) bringing the substrate into contact with a liquid composition comprising a catalyst of olefin polymerization, then b) separation of the substrate from the said liquid composition, then c) gas-phase polymerization of at least one olefin in the presence of the said substrate.

Before the contact in stage a) is brought about the surface of the substrate to be coated is preferably rid of any organic and/or inorganic impurity and in particular of any moisture. The substrate may be cleaned using an organic solvent chosen from aliphatic hydrocarbons like hexane, alicyclic hydrocarbons like cyclohexane and aromatic hydrocarbons like toluene, and then dried under a stream of an inert gas like nitrogen or argon, for example at atmospheric pressure between 50° and 90° C.

The liquid composition can optionally be the catalyst itself if it is liquid in the conditions of the contact and if it is not too much agressor in pure state toward the substrate to be coated. The liquid composition can also be a solution of a catalyst. For the sake of simplification, it is considered that the expression "solution of a catalyst" does not exclude the case of a pure liquid catalyst, this case being equivalent to a solution containing a very low amount of solvent.

The contact may be brought about in various ways, depending on the geometry of the substrate to be coated. This contact may be brought about by soaking in the solution of the polymerization catalyst. This contact may also be brought about by spraying the solution of the catalyst onto the substrate.

The contact may be brought about by spraying the solution in the form of droplets onto the substrate, these droplets being formed by means of a nozzle to which the catalyst solution is delivered under pressure (aerosol or spray).

A possibility which is not ruled out is that of producing the contact by evaporating the catalyst solution and then condensing this solution on the item to be coated, since the vapor pressures of the various constituents of the catalyst solution allow this without this operation resulting in a detrimental alteration to the composition of the catalyst solution.

In the case where it is proposed to coat the inner walls of vessels or of reactors as well as their internal accessories, this contact may be brought about by filling the vessel or the reactor with the catalyst solution or with a mixture of a solid filler and of the catalyst solution. In the case where this mixture constitutes a suspension, that is to say that all the space between the various components constituting the filler is filled with catalyst solution, the presence of this solid filler makes it possible to reduce the quantity of catalyst solution that is necessary for producing the contact.

There is no lower limit to the quantity of solid filler, since solid filler/liquid catalyst solution mixture contains enough liquid to produce the contact.

When the quantity of solid filler is so large that the solid filler/catalyst solution mixture is no longer a suspension, it is preferable to adjust the ratio of mass of catalyst solution/mass of solid filler in the mixture so that the porosity of the filler is filled, that is to say saturated, with the catalyst solution. It may be noted, in particular, that the saturation point of the solid filler is reached when the solid filler/catalyst solution mixture flows with markedly greater difficulty.

The solid filler generally consists of a combination of particles and/or of granules whose Dw50 may, for example, be between 50 and 3000 µm. Dw50 denotes the diameter below which 50% by weight of the particles and/or granules constituting the filler are to be found. This solid filler preferably does not contain any particle of diameter smaller than 100 µm.

When the quantity of solid filler is so large that the solid filler/catalyst solution mixture is no longer a suspension, it is preferable that the solid filler should have a Dw50 ranging from 500 to 2000 µm.

When the quantity of solid filler is so large that the solid filler/catalyst solution mixture is no longer a suspension, it is preferable that the solid filler should have a spheroidal morphology with good flowability.

15 to 100 ml of catalyst solution may be employed per 100 grams of solid filler, so as to produce a mixture for bringing into contact.

The solid filler may consist of any material that is inert towards, on the one hand, the catalyst solution which it is proposed to employ and, on the other hand, the substrate to be coated. This solid filler may be made of polyolefin, such as of polyethylene or polypropylene, or of α-olefin copolymer.

In the case where it is desired to coat the inner walls of a vessel or of a reactor as well as its possible internal accessories, and where a catalyst solution with or without filler has been introduced into the vessel or reactor, the contact between the inner wall and the catalyst solution may be improved by agitating the interior of the vessel or of the reactor. This agitation is indispensable in particular when a mixture of catalyst solution and of filler has been introduced into the vessel or reactor and when this mixture does not constitute a suspension in the sense given above. The agitation will, of course, have to be sufficiently gentle not to cause the attrition of the filler or of the inner wall of the vessel or reactor.

To implement the process according to the invention it is possible to employ as catalyst solution a solution including:

I) a catalyst consisting of a catalyst system including
   Ia) a derivative of a transition metal M, and
   Ib) a cocatalyst capable of activating the transition metal, and
II) a solvent.

The transition metal derivative, the cocatalyst and the solvent must be chosen so that they form a solution when they are mixed with a view to forming the solution of the transition metal compound in the desired concentration of transition metal compound and of cocatalyst.

As derivative of a transition metal M it is possible to employ a compound of formula $ML_x$ in which M denotes a transition metal, L denotes a ligand coordinated to the transition metal and x denotes a number equal to the valency of the transition metal. In the compound of formula $ML_x$ the transition metal M has as many ligands L, which may be identical or different, as its valency. At least one ligand L is preferably a group with a structure of the cycloalkadienyl type, that is to say either the cycloalkadienyl group itself or a cycloalkadienyl group which is substituted, for example by a hydrocarbon group. When the compound of formula $ML_x$ contains at least two groups with a structure of cycloalkadienyl type, at least two of these groups may be bonded to each other by a divalent radical.

At least one ligand L may be chosen from the groups of formula —O—, —S—, —NR$^3$— or —PR$^3$—, in which one of the free valencies is bonded to the atom of transition metal M and the other free valency is bonded to a divalent radical, itself bonded to a ligand L with a cycloalkadienyl structure, in which R$^3$ denotes hydrogen or a group chosen from the silyl, alkyl or aryl groups, these two latter groups being optionally halogenated.

At least one ligand L may be chosen from the groups of formula —OR$^4$, —SR$^4$, —NR$^4_2$ or —PR$^4_2$ in which the free valency is bonded to a divalent radical, itself bonded to a ligand L with a cycloalkadienyl structure, in which R$^4$ denotes hydrogen or a group chosen from the silyl, alkyl or aryl groups, these two latter groups being optionally halogenated.

Each divalent radical may be an alkylene radical such as the methylene radical (—CH$_2$—) or the ethylene (—CH$_2$CH$_2$—) or trimethylene radical (—CH$_2$CH$_2$CH$_2$—), it being possible for this alkylene radical to be also substituted, for example by at least one hydrocarbon group like the isopropylidene radical. This divalent radical may be a silylene group (—SiH$_2$—) which is optionally substituted, for example by at least one hydrocarbon group, as is the case with the dimethylsilylene or diphenylsilylene radical.

The ligands L with a cycloalkadienyl structure preferably have a cyclopentadienyl structure, that is to say are cyclopentadienyl groups or are substituted cyclopentadienyl groups like, for example, the fluorenyl group or the indenyl group.

The ligands L which differ from the abovementioned ones may be hydrocarbon groups containing from 1 to 12 carbon atoms, halogens or hydrogen. Hydrocarbon groups which may be mentioned are alkyl, cycloalkyl, aryl and aralkyl groups, which includes the methyl, ethyl, propyl, isopropyl, butyl, cyclopentyl, cyclohexyl, phenyl, tolyl and benzyl groups. Fluorine, bromine, iodine and chlorine may be mentioned as halogen.

A number of compounds of formula $ML_x$ may be present within the catalyst solution.

Among the compounds of formula $ML_x$, those in which M denotes zirconium, titanium or hafnium are preferred.

By way of example, the compound of formula $ML_x$ may be chosen from the following compounds:

bis (cyclopentadienyl) dichlorozirconium, ethylenebis (4,5, 6, 7-tetrahydro-1-indenyl)dichlorozirconium, ethylenebis (indenyl) dichlorozirconium, isopropylidene (cyclopentadienyl, fluorenyl) dichlorozirconium, dimethylsilyl(3-tert-butylcyclopentadienyl, fluorenyl) dichlorozirconium, bis(cyclopentadienyl) dimethylzirconium, ethylenebis(4,5,6,7-tetrahydro-1-indenyl)dimethylzirconium ethylenebis(indenyl) dimethylziconium, isopropylidene (cyclopentadienyl, fluorenyl)dimethylzirconium, dimethylsilyl(3-tert-butylcyclopentadienyl, fluorenyl)dimethylzirconium, dimethylsilyl(tetramethylcyclopentadienyl, tertbutylamino) dichlorozirconium, this latter compound having the formula $(CH_3)_2Si((CH_3)_4C_5, (CH_3)_3CN)ZrCl_2$, dimethylsilyl (tetramethylcyclopentadienyl, tert-butylamino) dimethyltitanium, this compound having the formula $(CH_3)_2Si((CH_3)_4C_5, (CH_3)_3CN)Ti(CH_3)_2$, and dimethylsilanediylbisindenylzirconium dichloride.

The derivative of a transition metal may also be chosen from the compounds of formula $Ti(OR)_{4-x}Cl_x$ in which R denotes an alkyl radical containing from 1 to 8 carbon atoms and x denotes an integer ranging from 0 to 3.

The derivative of a transition metal is generally present in the catalyst solution in a proportion of 1 millimole of transition metal per liter of solution up to the saturation of the chosen solvent, and in particular in a proportion of 5 to 50 millimoles of transition metal per liter of solution.

The cocatalyst may be a linear aluminoxane of formula

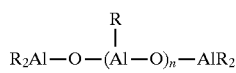

or a cyclic one of formula

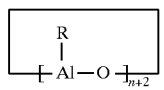

R denoting an alkyl radical containing from one to six carbon atoms and n denoting an integer ranging from 2 to 40, preferably from 10 to 20. The aluminoxane may contain groups R of a different kind. Preferably all the groups R denote methyl groups.

The cocatalyst for a compound of formula $Ti(OR)_{4-x}Cl_x$, may also be chosen from organic aluminum derivatives and in particular the compounds of formula $R^1 R^2 R^3 Al$ in which each of $R^1$, $R^2$ and $R^3$, which may be identical or different, denotes either a halogen atom like chlorine or bromine or an alkyl group containing from 1 to 20 carbon atoms, at least one of $R^1$, $R^2$ and $R^3$ denoting an alkyl group. Examples of a suitable compound which may be mentioned are ethylaluminium dichloride or dibromide, isobutylaluminium dichloride or dibromide, diethylaluminium chloride or bromide, di-n-propylaluminium chloride or bromide and diisobutylaluminium chloride or bromide. A trialkylaluminium is employed in preference to the abovementioned compounds, such as tri-n-hexylaluminium, triisobutylaluminium, trimethylaluminium or triethylaluminium.

When the cocatalyst contains aluminium atoms, the cocatalyst is generally present in the catalyst solution in a quantity such that the Al/M atomic ratio ranges from $5\times10^4$ to 1. When the derivative of a transition metal is a compound of formula $ML_x$, the Al/M ratio preferably ranges from $5\times10^4$ to 10. When the derivative of a transition metal is a compound of formula $Ti(OR)_{4-x}Cl_x$, the Al/M ratio ranges from 200 to 1.

Any solvent that is inert towards the substrate to be coated, towards the catalyst and towards the optional filler, dissolving the catalyst as mentioned above, can be suitable.

The solvent for the catalyst solution may be chosen from nonprotic, and preferably nonpolar solvents. The solvent for the said solution may be chosen from linear or branched aliphatic hydrocarbons containing from 5 to 20 carbon atoms, like n-pentane, n-hexane or n-heptane, or optionally substituted alicyclic hydrocarbons containing from 6 to 20 carbon atoms, like cyclohexane, or preferably optionally substituted aromatic hydrocarbons containing from 6 to 20 carbon atoms, like toluene, benzene, xylene or ethylbenzene. Toluene is the preferred solvent.

Once the substrate has been brought into contact with the catalyst solution, the substrate is separated from the medium employed for bringing about contact. In the case where, with a view to coating the inner walls of a vessel or of a reactor, the vessel or the reactor might have been filled with the catalyst solution or with a solid filler/catalyst solution mixture, to bring about this contact, this merely means that the vessel or the reactor is emptied. In the case where the contact would have been brought about by soaking the substrate in the catalyst solution, the separation of the substrate from the medium employed for bringing about the contact is merely produced by taking the substrate out of the catalyst solution.

In all cases, for this separation of the substrate from the medium employed for bringing about the contact, there is no need to go beyond the removal of the excess liquid capable of trickling at the surface of the substrate.

After separation of the substrate from the catalyst solution a gas-phase polymerization of at least one olefin is carried out in the presence of the said substrate. In the context of the present application, the term polymerization covers copolymerization reactions. For this polymerization the substrate may be placed in a reactor for gas-phase polymerization of olefins. If it is the inner walls of a vessel or of a chemical reactor that it is proposed to coat, the polymerization may be carried out inside this vessel or this reactor by introducing inside this reactor the gaseous monomers to be polymerized.

The conditions for implementing the gas-phase polymerization, especially temperature, pressure, injection of the olefin or of the olefins and control of the polymerization temperature and pressure, are similar to those proposed in the prior art for the gas-phase polymerization of olefins. The operation is generally carried out at a temperature which is lower than the melting point Tm of the polymer or prepolymer to be synthesized, and more particularly between +20° C. and (Tm−5)°C., and at a pressure such that the olefin or olefins are essentially in vapour phase.

A chain-transfer agent may be added to the polymerization mixture so as to control the melt index of the polymer or copolymer to be produced. The preferred chain-transfer agent is hydrogen, which is employed in a quantity that can range up to 90% and preferably lies between 0.1 and 60 mol % of the total of olefins and hydrogen delivered to the reactor.

The olefins which may be employed for the polymerization are, for example, olefins containing from two to twenty carbon atoms and in particular the alpha-olefins of this group. Olefins which may be mentioned are ethylene, propylene, 1-butene, 4-methyl-1-pentene, 1-octene, 1-hexene, 3-methyl-1-pentene, 3-methyl-1-butene or mixtures thereof. The term polymerization as used in the present application therefore covers copolymerization reactions, and the term polymer covers copolymers.

Among the alpha-olefin mixtures preference is given to a mixture of ethylene and of at least one alpha-olefin containing from three to six carbon atoms, the percentage of ethylene in the mixture being generally higher than 90% by weight.

At least one electron-donor may be added to the polymerization mixture. This electron-donor may be, for example, chosen from Lewis bases, esters and polyesters of oxygen-containing acids, ethers and polyethers, amines, silicon compounds such as silanes and alkylalkoxysilanes of formula $SiR^1R^2(OR)_2$, $SiR^1(OR)_3$ or $SiR^1R^2R^3(OR)$, in which R, $R^1$, $R^2$ and $R^3$, which may be identical or different, are hydrocarbon groups containing from 1 to 12 carbon atoms, and from phosphorus compounds such as phosphates and phosphonates, the preferred ones being the alkyl esters or polyesters of an aromatic acid, alkyl mono- or diethers, alkoxysilanes and alkylalkoxysilanes.

Depending on the nature of the catalyst employed, and in particular on its moisture-sensitivity, it is advisable to protect the substrate, as soon as its surface is cleaned, and the catalyst solution from the surrounding air, for example by performing all the stages of the process according to the invention under an inert atmosphere like, for example, a nitrogen or argon atmosphere. In particular, these precautions should be taken in the case of the catalysts of formula $ML_x$ or $Ti(OR)_{4-x}Cl_x$, referred to above. Thus, in the case of these catalysts, the vessel in which the contact is to be brought about preferably contains less than 10 and, still more preferably, less than 1 ppm of water.

Coatings on all kinds of substrate may be produced by virtue of the process according to the invention. It is preferable that the substrate should be properly wettable by the catalyst solution which it is proposed to employ for bringing about the contact. This may be checked, in particular, by routine tests within the competence of a person skilled in the art. To do this, it suffices to place a drop of the catalyst solution at the surface of the substrate which it is proposed to coat and to measure the angle formed by the tangent to the drop at the drop/substrate point of contact, on the one hand, with the substrate, on the other hand. It is preferable that the drop should tend to spread on the surface to be coated.

The process according to the invention may be used in particular for coating metals such as copper and its alloys, aluminium and its alloys, cast iron, carbon steels, stainless steels such as nickel and/or chromium steels, it being possible for the said steels to contain molybdenum, nickel and its alloys such as the alloys known as Inconel, and chromium and its alloys. In particular, steels 304, 316 and 316L may be mentioned as steel.

The thickness of the coating obtained by the process according to the invention can vary in practically infinite proportions. In fact, a very thin coating, for example less than 10 $\mu$m in thickness, can be obtained by controlling the quantity of monomer to be polymerized during stage c). A thick coating, for example greater than 50 $\mu$m in thickness, may be obtained by repeating the process according to the invention a number of times in succession. Generally, the process according to the invention, applied once, makes it possible, unless the quantity of monomer introduced in stage c) is deliberately limited, to produce a coating with a thickness of less than 50 $\mu$m and more generally between 10 and 50 $\mu$m.

The invention also relates to the use of an item including a substrate and a polymer coating for coming into contact with polyolefin particles, the polymer constituting the coating including chain sequences of formula —$CH_2$—CHR—. In the present application the term polymer also covers copolymers and the term polyolefin also covers copolymers resulting from the copolymerization of different olefins.

It is found that items which are not coated and are employed for coming into contact with polyolefin particles may become covered with aggregates of these particles as a result of phenomena of accumulation of electrostatic charges. The use according to the invention instead of the use of uncoated items makes it possible to reduce, or even to completely inhibit, these phenomena, which present the risk of being detrimental to the optimum functioning of the plants of which the said items form a part.

The problem of the accumulation of electrostatic charges arises in numerous plants in which particles are set in motion, and in particular in plants in which polyolefin particles are conveyed or agitated, either mechanically or by a liquid or by a gas.

The substrate of the items with which the invention is concerned may be made of material of any kind and in particular of metal such as copper and its alloys, aluminium and its alloys, cast iron, carbon steels, stainless steels such as nickel and/or chromium steels, it being possible for the said steels to contain molybdenum, nickel and its alloys such as the alloys known as Inconel, and chromium and its alloys. In particular, steels 304, 316 and 316L may be mentioned as steel.

Such an item may be a pipe inside which a polyolefin powder is caused to travel with the aid of a gas or of a liquid. Such an item may be a vessel or a reactor intended to contain a fluidized or agitated bed of powders in the presence of a gas or of a liquid, and accessories of this reactor, like its optional stirring impeller or its optional baffles. This reactor may be a reactor for gas-phase polymerization of olefins.

The beneficial effect of the polymer coating commences as soon as the coating is of monoatomic thickness and even if this coating is noncontinuous. There is no upper limit to the thickness of this coating, except for those imposed by the normal functioning of the item.

A coating whose thickness is between 5 $\mu$m and 100 $\mu$m is generally suitable. Coatings of thickness much greater than 100 $\mu$m may be employed.

The coating may be produced by simple mechanical securing to the substrate to be coated, such as, for example, by screwing or riveting polymer sheets or films onto the said substrate. If the geometry of the substrate so allows, the coating may be produced by dipping the substrate, preheated to a temperature that is higher than the melting point of the polymer, in a fluidized bed of powder of the said polymer.

This coating may also be produced by spraying onto the substrate to be coated a polymer powder which is raised to a temperature that is higher than the melting point of the said polymer.

The coating may also be produced by adhesive bonding of polymer sheets or films onto the substrate to be coated, it being understood that the use of an adhesive or of any other third body must be compatible with the conditions of use of the item including the coating.

The use according to the invention is characterized in that the polymer constituting the coating includes chain sequences of formula —$CH_2$—CHR— in which R denotes a hydrogen atom or an alkyl radical containing from 1 to 10 carbon atoms.

Preferably, of course, the polymer does not exhibit any adhesive property of nonelectrical origin towards the moving particles, that is to say that it is not capable of retaining the said particles by surface roughness or by an interaction of a physicochemical nature, such as by diffusion or by chemical reaction. This may be ascertained by checking that the polymer does not retain the moving particles when neither the polymer nor the particles are electrically charged.

By way of example, the polymer constituting the coating may include polyamide units of formula —CO—NH—($CH_2$)n— in which n denotes an integer greater than or equal to 2, but preferably includes units of polyolefin type. The coating may be made of high-density linear polyethylene (relative density>0.950), of intermediate to very low density alpha-olefin polymer or copolymer (0.9<relative density<0.95) of linear type with short branches or of branched type with long branches and short branches, of polypropylene or copolymer of propylene and of at least one alpha-olefin exhibiting an isotacticity value greater than 60% by weight, measured by the proportion of the mm triads using NMR, or of syndiotactic polypropylene or syndiotactic copolymer of propylene and of at least one alpha-olefin exhibiting a syndiotacticity value higher than 60% by weight, measured by the proportion of the rr triads using NMR.

The coating is preferably a polymer or copolymer of at least one olefin and, more preferably, is entirely produced from monomers belonging to the class of olefins.

Preferably too, the polymer constituting the coating and the polyolefin particles originate from the same monomers.

A polyolefin coating may also be produced by a chemical process like that also forming the subject of the present invention and described above.

In the examples which follow, the influence of a polyethylene or polypropylene coating on the tendency of a polyethylene or polypropylene powder to cling to the wall and the stirrer of a stirred chemical reactor is described in particular. For a better comparison of the results, the latter are collated in Tables 1 and 2:

Table 1: stirring a high-density polyethylene (PE) powder in a reactor without any coating (Example 5), with a polyethylene coating (Example 1) or with a polypropylene coating (Example 4).

Table 2: stirring a polypropylene (PP) powder in a reactor without any coating (Example 6), with a polyethylene coating (Example 2) or with a polypropylene coating (Example 3).

The particle size distribution of the powders employed in the examples is represented by the parameter SPAN, which is equal to the ratio (Dw90–Dw10)/Dw50, in which Dw90, Dw10 and Dw50 denote the diameter below which 90%, 10% and 50% by weight of the particles are to be found, respectively. These diameters have been determined by screening.

EXAMPLES

Example 1

It is proposed to coat with polyethylene the inner wall and the stirrer of a spherical polymerization reactor. This reactor has an internal capacity of 8.2 liters and is made of 316L steel. This reactor is fitted with a temperature control and a stirring system. The reactor employed is described in detail in U.S. Pat. No. 4,467,080. Into this reactor are introduced 100 grams of high-density polyethylene (HDPE) powder which has a Dw50 of 710 $\mu$m and an SPAN of 0.9. The solution of a catalyst prepared beforehand as follows is introduced next:

the following are placed in a Schlenk tube purged with nitrogen:
  20 ml of toluene
  20 ml of a solution of methyl aluminoxane (MAO) in toluene at a concentration of 30% by weight of MAO,
  200 mg of $ZrCp_2Cl_{21}$ Cp denoting a cyclopentadienyl group.

The reactor is stirred at 400 revolutions per minute, two hours at 90° C. The powder is then drawn off through a bottom valve, the reactor is closed again and 8 bars of partial pressure of ethylene are applied. The pressure is seen to drop by 2 bars over 1 hour and to stabilize. The reactor is decompressed, purged with nitrogen and the reactor is opened. It is found that the inner wall and the stirrer of the reactor are covered on their working surfaces, that is to say the surfaces which have been in contact with the catalyst solution, with a continuous coating of high-density polyethylene.

The quality of the coating is tested in the following manner: the reactor thus coated is charged with 500 grams of high-density polyethylene powder with a Dw50 of 710 $\mu$m and an SPAN of 0.9 and the reactor is stirred at 400 revolutions per minute for 7 hours. No adverse change in the coating is found.

Furthermore, the adhesion of the film to the wall is such that the film does not allow itself to be torn away merely by pulling.

A part of the coating may be isolated by scraping, which makes it possible to determine by weighing that it has a mean thickness of 30 $\mu$m.

The weight-average molecular mass Mw of the polyethylene constituting the coating is 90200 grams per mole.

In what follows, the effect of the polyethylene coating on the clinging to the walls of a polyethylene powder such as is usually manufactured in a gas-phase polymerization reactor is described.

The coated reactor is charged with 300 grams of high-density polyethylene with a Dw50 of 700 $\mu$m and an SPAN of 0.7, the temperature of the reactor is raised to 90° C. and the nitrogen pressure is adjusted to 6 bars absolute. The interior of the reactor is stirred at 400 revolutions per minute for one hour. The reactor is decompressed and the bottom valve is opened. 282 g of powder are thus recovered. The reactor is then opened and 18 g of powder are recovered by wiping the walls and the stirrer.

Example 2

The procedure is as in Example 1, except that the effect of the polyethylene coating on the clinging to the walls of an isotactic polypropylene powder which has a Dw50 of 540 $\mu$m and an SPAN of 1.12 is tested at 70° C.

287 g of powder are recovered via the bottom valve. 13 g of powder are recovered by wiping the walls and the stirrer.

Example 3

It is proposed to coat with polypropylene the inner wall and the stirrer of a spherical polymerization reactor. This reactor has an internal capacity of 8.2 liters and is made of 316L steel. This reactor is equipped with a temperature control and a stirring system. The reactor employed is described in detail in U.S. Pat. No. 4,467,080. The coating treatment whose description follows is applied to the interior of the reactor.

Into this reactor are introduced 200 grams of high-density polyethylene (HDPE) powder which has a Dw50 of 1900 $\mu$m and an SPAN of 0.6. The solution of a catalyst prepared beforehand as follows is introduced next:

the following are placed in a Schlenk tube purged with nitrogen:
  40 ml of toluene
  40 ml of a solution of methylaluminoxane (MAO) in toluene at a concentration of 30% by weight of MAO,
  600 mg of rac-dimethylsilanediylbisindenylzirconium dichloride.

The reactor is stirred at 400 revolutions per minute, two hours at 70° C. The powder is next drawn off via a bottom valve, the reactor is closed again and a partial pressure of propylene is applied, which is maintained at 5 bars by continuous addition of propylene for two hours. The reactor is decompressed, purged with nitrogen and the coating treatment is repeated.

The reactor is opened. It is found that the inner wall and the stirrer of the reactor are covered on their working surfaces, that is to say the surfaces which have been in contact with the catalyst solution, with a continuous coating of polypropylene.

The mechanical quality of the coating is tested in the following manner: the reactor thus coated is charged with 500 grams of high-density polyethylene powder with a Dw50 of 710 $\mu$m and an SPAN of 0.9 and the reactor is stirred at 400 revolutions per minute for 7 hours. No adverse change in the coating is found.

Furthermore, the adhesion of the film to the wall is such that the film does not allow itself to be torn away merely by pulling.

A part of the coating can be isolated by scraping, which allows it to be analyzed. By weighing, it is possible to determine that it has a mean thickness of 25 $\mu$m. It has an isotacticity value of 85%, measured by NMR, and a weight-average molecular mass of 40,000 grams per mole.

In what follows, the effect of the polypropylene coating on the clinging to the walls of a polypropylene powder such as is usually manufactured in a gas-phase polymerization reactor is described.

The coated reactor is charged with 300 grams of isotactic polypropylene with a Dw50 of 540 μm and an SPAN of 1.12, the reactor temperature is raised to 70° C. and the nitrogen pressure is adjusted to 6 bars absolute. The interior of the reactor is stirred at 400 revolutions per minute for one hour. The reactor is decompressed and the bottom valve is opened. 290 g of powder are thus recovered. The reactor is then opened and 10 g of powder are recovered by wiping the walls and the stirrer.

Example 4

The procedure is as in Example 3, except that the effect of the polypropylene coating on the clinging to the walls of a high-density polyethylene powder which has a Dw50 of 700 μm and an SPAN of 0.7 at 90° C. is tested.

253 g of powder are recovered via the bottom valve. 47 g of powder are recovered by wiping the walls and the stirrer.

Example 5 (Comparative)

In what follows, the procedure is as in Example 1, except that no polyethylene coating has been produced on the inner wall of the reactor and on the stirrer.

229 g of powder are recovered via the bottom valve. 71 g of powder are recovered by wiping the walls and the stirrer.

Example 6 (Comparative)

In what follows, the procedure is as in Example 3, except that no polypropylene coating has been produced on the inner wall of the reactor and on the stirrer.

192 g of powder are recovered via the bottom valve. 108 g of powder are recovered by wiping the walls and the stirrer.

Example 7 a) Manufacture of a Prepolymer

The following are introduced, after a purge with nitrogen, into a 2.5-litre spherical reactor made of steel, equipped with a stirring system and a temperature control:

0.5 liters of hexane 2 millimoles of trihexylaluminium (THA)

3.5 grams of a spheroidal solid catalytic component on a magnesium chloride support, containing 8.4% by weight of titanium and 1.8% by weight of aluminium.

The mixture is heated to 65° C. with stirring and 42 g of ethylene are introduced over 1 hour and 40 minutes. 2 millimoles of THA and 1.5 bars of hydrogen are introduced next, followed by 98 g of ethylene over 2 hours 20 minutes.

The reactor is purged with nitrogen and the solvent is evaporated off by entrainment with nitrogen at 75° C. A dry powder is thus obtained. This powder is cooled to 20° C. and 37.5 millimoles of TEA are added with stirring.

145 g of a prepolymer powder exhibiting good pourability are recovered and are kept under nitrogen.

b) Polymerization in the presence of a prepolymer:

The following are introduced at 90° C., after purging with nitrogen, into a reactor identical with that of Example 1, coated with polyethylene as in Example 1

50 grams of filler powder originating from a polymerization test identical with that described here, then 5.75 bars of partial pressure of hydrogen, then 8 bars of partial pressure of ethylene, then by blowing with nitrogen, 1.5 grams of an ethylene prepolymer, the manufacture of which was described above, the quantity of nitrogen being such that the total pressure in the reactor is 20 bars absolute.

The total pressure is kept constant by addition of ethylene for two hours. The reactor is then decompressed and cools to ambient temperature. 213 grams of polyethylene powder with a Dw50 of 790 μm and an SPAN of 1.44 are recovered via the bottom valve of the reactor and 12 grams of powder remain clinging to the wall and to the stirrer in the reactor.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

TABLE 1

| PE POWDER | Weight (g) of P powder not clinging | Weight (g) of P powder clinging |
|---|---|---|
| with PE coating (Example 1) | 282 | 18 |
| with PP coating (Example 4) | 253 | 47 |
| without coating (Example 5) | 229 | 71 |

TABLE 2

| PP POWDER | Weight (g) of P powder not clinging | Weight (g) of P powder clinging |
|---|---|---|
| with PP coating (Example 3) | 290 | 10 |
| with PE coating (Example 2) | 287 | 13 |
| without coating (Example 6) | 192 | 108 |

I claim:

1. Process for producing a polyolefin coating on a metal substrate, comprising:

a) bringing the substrate into contact with a liquid composition comprising a catalyst of olefin polymerization, then b) separating the substrate from the said liquid composition, then c) conducting in situ gas-phase polymerization of at least one olefin in the presence of the substrate to form the polyolefin coating thereon.

2. Process according to claim 1, wherein the liquid composition is a solution of a catalyst which includes:

I. a catalyst consisting of a catalyst system including

I.a—a derivative of a transition metal M, and

I.b—a cocatalyst capable of activating the transition metal M and

II. a solvent.

3. Process according to claim 2, wherein the derivative of a transition metal is a compound of formula $ML_x$ in which M denotes a transition metal, L denotes at least one ligand coordinated to the transition metal and x denotes a number equal to the valency of the transition metal.

4. Process according to claim 3, wherein at least one ligand L is a group with a structure of the cycloalkadienyl type.

5. Process according to claim 1 wherein the metal M is zirconium.

6. Process according to claim 1, wherein the derivative of a transition metal is present in the catalyst solution in a proportion of 1 millimole per liter of solution up to the saturation of the solvent.

7. Process according to claim 2, wherein the cocatalyst is a linear aluminoxane of formula $$R_2Al-O-(Al-O)_n-AlR_2,$$
$$\phantom{R_2Al-O-(}|\phantom{Al-O)_n-AlR_2,}$$
$$\phantom{R_2Al-O-(}R\phantom{Al-O)_n-AlR_2,}$$

or a cyclic one of formula $$\left[ \begin{array}{c} R \\ | \\ Al-O \end{array} \right]_{n+2}$$

R denoting an alkyl radical containing from one to six carbon atoms and n denoting an integer ranging from 2 to 40.

8. Process according to claim 7, wherein R denotes a methyl group.

9. Process according to claim 7, wherein the cocatalyst is present in the catalyst solution in a quantity such that the Al/M atomic ratio ranges from $5\times10^3$ to 10.

10. Process according to claim 2, wherein the solvent is selected from optionally substituted aromatic hydrocarbons containing from 6 to 20 carbon atoms.

11. Process according to claim 10, wherein the solvent is toluene.

12. Process according to claim 1, wherein the metal is a steel.

13. Process according to claim 6, wherein the proportion is 5 to 50 millimoles per liter of solution.

14. Process according to claim 1, wherein n is from 10 to 20.

15. Product including a substrate and a coating obtained by the process of claim 1, wherein the substrate is made of metal.

16. Product according to claim 15, wherein the metal is a steel.

17. Product according to, claim 15, wherein the coating has a thickness of less than 50 μm.

18. Product according to claim 17, wherein the coating has a thickness of between 10 and 50 μm.

19. Product according to claim 15, wherein the substrate is a vessel or a chemical reactor or the internal accessories of a chemical reactor.

20. Product according to claim 19, wherein the substrate is the inner wall of a reactor for olefin polymerization and, optionally, its internal accessories.

21. Product according to claim 20, wherein the reactor is a reactor for gas-phase olefin polymerization.

22. Method of use of a product including a substrate and a polymer coating for coming into contact with polyolefin particles, comprising contacting said particles with a polymer in which the polymer constituting the coating includes chain sequences of formula —CH$_2$—CHR— in which R denotes a hydrogen atom or an alkyl radical containing from 1 to 10 carbon atoms.

23. Method of use according to claim 22, wherein the polymer constituting the coating is a polymer or copolymer of at least one olefin.

24. Method of use according to claim 23, wherein the polymer constituting the coating is made of polyethylene.

25. Method of use according to claim 23, wherein the polymer constituting the coating is made of polypropylene.

26. Method of use according to claim 22, wherein the polyolefin particles are made of polyethylene.

27. Method of use according to claim 22, wherein the polyolefin particles are made of polypropylene.

28. Method of use according to claim 22, wherein the product is a vessel or a chemical reactor and its optional internal accessories.

29. Method of use according to claim 28, wherein the product is a polymerization reactor and its optional internal accessories.

30. Method of use according to claim 29, wherein the product is a reactor for gas-phase polyolefin polymerization and its optional internal accessories.

31. Method of use according to claim 22, wherein the substrate is made of metal.

32. Method of use according to claim 22, wherein the metal is a steel.

33. A process for producing a polyolefin coating on a metal substrate comprising:
covering said substrate with a catalyst solution for olefin polymerization which includes:
(a) a catalyst system comprising a derivative of a transition metal having formula ML$_x$
in which:
M denotes the transition metal,
L denotes at least one ligand coordinated to the transition metal, and
x denotes a number equal to the valency of the transition metal;
(b) a linear aluminoxane cocatalyst for activating the transition metal M and having the formula:

$$R_2Al-O-(Al-O)_n-AlR_2$$
$$\phantom{R_2Al-O-(}|\phantom{Al-O)_n-AlR_2}$$
$$\phantom{R_2Al-O-(}R\phantom{Al-O)_n-AlR_2}$$

or a cyclic one having the formula:

$$\left[ \begin{array}{c} R \\ | \\ Al-O \end{array} \right]_{n+2}$$

in which:
R denotes an alkyl radical containing from one to six carbon atoms, and
n denotes an integer ranging from 2 to 40;
(c) a solvent; and
conducting in situ gas-phase polymerization of at least one olefin in the presence of said substrate to form the polyolefin coating thereon.

34. The process of claim 33 wherein said at least one ligand is a group with a structure of the cycloalkadienyl type.

35. The process of claim 33 wherein the coating has a thickness between 10 and 50 μm.

36. The process of claim 33 wherein the coating has a thickness of less than 50 μm.

37. The process of claim 33 wherein said substrate is covered with said catalyst solution by being immersed in and then removed from said catalyst solution.

38. The process of claim 33 wherein said substrate is covered with said catalyst solution by spraying said catalyst solution on said substrate.

39. The process of claim 33 wherein said substrate is covered with said catalyst solution by evaporating said liquid composition and then condensing the evaporated catalyst on said substrate.

40. The process of claim 33 wherein said substrate is an interior of a vessel.

41. The process of claim 40 wherein said vessel is a chemical reactor.

42. The process of claim 41 wherein said substrate further includes internal accessories of the chemical reactor.

43. A substrate coated according to the process of claim 33.

44. A vessel coated according to the process of claim 40.

45. A chemical reactor coated according to the process of claim 41.

46. The reactor of claim 45 wherein the reactor is a polymerization reactor, and wherein the internal accessories of the reactor are additionally coated.

47. A pipe coated interiorly thereof according to the process of claim 33.

48. Process comprising reducing the phenomena of accumulation of electrostatic charges and of the covering of an item with aggregates of particles, said item being employed for coming into contact with polyolefin particles, wherein the item includes a substrate and a coating of polymer including chain sequences of formula $CH_2$—CHR— in which R denotes a hydrogen atom or an alkyl radical containing from 1 to 10 carbon atoms.

49. Process comprising containing or conveying or agitating polyolefin particles in motion in a plant, wherein at least one item employed for coming into contact with said particles includes a substrate and a coating of polymer including chain sequences of formula $CH_2$—CHR— in which R denotes a hydrogen atom or an alkyl radical containing from 1 to 10 carbon atoms.

50. Process comprising contacting an item with polyolefin particles in motion, wherein the item includes a substrate and a coating of polymer including chain sequences of formula $CH_2$—CHR— in which R denotes a hydrogen atom or an alkyl radical containing from 1 to 10 carbon atoms.

51. A method of using a vessel to contain, convey and/or agitate polyolefin particles comprising coating the interior of the vessel with a polymer including chain sequences of formula $CH_2$—CHR— in which R denotes a hydrogen atom or an alkyl radical containing from 1 to 10 carbon atoms; and containing, conveying and/or agitating polyolefin particles in the vessel with a reduction in a phenomena of accumulating electrostatic charges that result in covering the interior surfaces of the vessel with aggregates of the polyolefin particles.

52. A method of using a chemical reactor to contain, convey and/or agitate polyolefin particles comprising coating the interior of the reactor with a polymer including chain sequences of formula $CH_2$—CHR— in which R denotes a hydrogen atom or an alkyl radical containing from 1 to 10 carbon atoms; and containing, conveying and/or agitating polyolefin particles in the reactor with a reduction in a phenomena of accumulating electrostatic charges that result in covering the interior surfaces of the reactor with aggregates of the polyolefin particles.

53. A method of reducing the accumulation of electrostatic charges and the formation of aggregates of polyolefin particles in plants in which said particles are set in motion, comprising utilizing for coming into contact with said particles an item including a substrate and a coating of a polymer including chain sequences of formula $CH_2$—CHR— in which R denotes a hydrogen atom or an alkyl radical containing from 1 to 10 carbon atoms.

54. A vessel for containing, conveying and/or agitating polyolefin particles comprising a polymer coating the interior of said vessel, said polymer including chain sequences of formula $CH_2$—CHR— in which R denotes a hydrogen atom or an alkyl radical containing from 1 to 10 carbon atoms.

55. The vessel according to claim 54, wherein said polymer coating is formed by in situ gas-phase polymerization of at least one olefin in the interior of said vessel.

56. The vessel according to claim 54, wherein said vessel is a chemical reactor or the internal accessories of a chemical reactor.

57. The vessel according to claim 54, wherein said vessel is a reactor for gas-phase olefin polymerization.

* * * * *